United States Patent [19]
Dietz et al.

[11] Patent Number: 4,592,763
[45] Date of Patent: Jun. 3, 1986

[54] METHOD AND APPARATUS FOR RAMPED PULSED BURST POWERING OF ELECTROSTATIC PRECIPITATORS

[75] Inventors: Peter W. Dietz, Schenectady; Philip H. Peters, Greenwich, both of N.Y.

[73] Assignee: General Electric Company, Schenectady, N.Y.

[21] Appl. No.: 681,170

[22] Filed: Dec. 13, 1984

Related U.S. Application Data

[63] Continuation of Ser. No. 482,677, Apr. 6, 1983, abandoned.

[51] Int. Cl.[4] ........................ B03C 3/68; G05B 24/02
[52] U.S. Cl. ........................................ 55/2; 55/105; 55/139; 323/271; 323/282; 323/903; 363/124
[58] Field of Search .......................... 55/2, 105, 139; 361/235; 323/903, 266, 271, 282; 363/28, 124

[56] References Cited

U.S. PATENT DOCUMENTS

| | | | |
|---|---|---|---|
| 3,641,740 | 2/1972 | Schumann et al. | 55/139 |
| 3,915,672 | 10/1975 | Penney | 55/2 |
| 4,052,177 | 10/1977 | Kide | 55/139 |
| 4,138,232 | 2/1979 | Masuda | 55/139 |
| 4,183,736 | 1/1980 | Milde | 55/139 |
| 4,209,306 | 6/1980 | Feldman et al. | 55/139 |
| 4,232,355 | 11/1980 | Finger et al. | 55/139 |
| 4,306,271 | 12/1981 | Weber | 361/235 |
| 4,322,786 | 3/1982 | Weber | 361/235 |
| 4,400,662 | 8/1983 | Coe, Jr. | 55/139 |
| 4,413,225 | 11/1983 | Dönig et al. | 55/105 |

FOREIGN PATENT DOCUMENTS

| | | | |
|---|---|---|---|
| 109945 | 5/1984 | European Pat. Off. . | |
| 2086673 | 5/1982 | United Kingdom | 55/139 |

OTHER PUBLICATIONS

K. Porle et al., Full Scale Experience with Pulsed Energization of Electrostatic Precipitators.
"High Voltage Thyristors Used in Precipitators" by Jerry F. Shoup and Thomas Lugar, Control Engineering, Aug. 1981.
"New Trends in Electrostatic Precipitations: Wide Duct Spacing, Precharging, Pulse Energization" by Helge H. Petersen, IEEE Transactions on Industry Applications, vol. IA-17, No. 5, p. 496, Sep./Oct., 1981.
Research-Cottrell, Utility Division, Technical Bulletin 1979.
A Pulse Voltage Source for Electrostatic Precipitators by Masuda, et al.

*Primary Examiner*—David L. Lacey
*Attorney, Agent, or Firm*—George B. Fox; James C. Davis, Jr.; Bernard J. Lacomis

[57] ABSTRACT

In order to mitigate the problem of back-corona discharge in electrostatic precipitators, method and apparatus are provided for energizing the precipitator electrodes with repeated bursts of high voltage electrical pulses, superimposed upon a direct current voltage level. Additionally, the voltage of the pulses in a single burst is increased from each pulse to the next pulse during the time period that the pulse burst is applied. The effect of the ramping of the pulse burst voltage is to increase the average electric field and ion density during the pulse burst. The result is substantially higher particle charging which leads to improved particle charging collection efficiency. Moreover, in addition to eliminating the back-corona discharge problem which particularly occurs in the collection of high resistivity dust particles, the present method and apparatus for precipitator energization achieves the same advantages as so-called board pulse powering precipitator methods, without, however, the concomitant circuit cost associated with high voltage and high power switching devices.

12 Claims, 5 Drawing Figures

METHOD AND APPARATUS FOR RAMPED PULSED BURST POWERING OF ELECTROSTATIC PRECIPITATORS

This application is a continuation of application Ser. No. 482,677, filed Apr. 6, 1983, now abandoned.

BACKGROUND OF THE DISCLOSURE

The present invention relates to electrostatic precipitators, and, more particularly, to circuits and methods for energizing such precipitators.

Electrostatic precipitators are electrical devices employed to remove particulate matter from a gaseous stream directed between oppositely charged precipitator electrodes. Precipitators are used in a number of industrial applications including chemical plants, and, more particularly, including electric power plants and other potential sources of particulate pollution. Recently, electrostatic precipitators have been much more frequently employed than in the past, because of the increased needs and desires for particulate removal from gases vented to the atmosphere. It should also be appreciated that the electrostatic precipitators of primary concern herein are high energy devices typically consuming several tens of kilowatts of electrical energy. Accordingly, proper precipitator energization is important, not only with respect to particle collection efficiency, but also with respect to economy and reliability of precipitator operation.

Many precipitator designs have been in the past. However, each basically operates upon fairly well-established principles. Precipitators generally include a pair of conductive electrodes. Typically, one of the electrodes comprises two parallel plane metallic sheets which are typically spaced about nine inches apart. The sheets are typically operated at ground potential. Additionally, a planar array of wires, connected electrically together and disposed midway between and parallel to the conductive sheets, comprises the second electrode. This planar wire array electrode is maintained at high electric potential. While it is possible to ground the wire electrodes and apply high potential voltage to the electrode sheets, this mode of operation is typically avoided for safety reasons. A number of the parallel plane electrodes are assembled in a housing which defines a plurality of parallel gas flow passages through the volume between the precipitator electrodes. These passages are also defined, at least in part, by the structure and arrangement of plate electrodes. In general, commercial precipitators employ a plurality of plate and wire grid electrode pairs. The area of a typical section of a precipitator may, in fact, possess up to about 30,000 square feet of plate electrode area. Naturally, such a configuration exhibits a certain amount of electrical capacitance between the wire and plate electrodes. The capacitance of a typical precipitator section is on the order of 0.05 to 0.15 microfarads. While the operation of such precipitators appears to be relatively simple, there are several phenomena which occur, which can limit precipitator particle collection efficiency. Different methods of energizing precipitators significantly affect the amount of electrical energy and power expended in removing a given fraction of particles from a gas stream in a given precipitator and with a given type of particle. It should be pointed out that precipitators generally operate at peak voltages of between about 40,000 and 80,000 volts and each section may draw current of about 1.5 amperes. It is thus easily seen that precipitator power levels of 80 kilowatts are not uncommon. Therefore, electrical efficiency is a significant economic factor in plants employing electrostatic precipitators for the removal of particulate matter. Furthermore, for continuous plant operation, reliability of the precipitator and precipitator energizing components is very important.

In normal operation, particulate matter in the gas to be treated acquires a negative charge as the result of induced ionization effects occurring principally in the vicinity of the precipitator cathode wires. The charged dust particles are then attracted to the precipitator anode plates where a layer of anode dust accumulates. As this dust layer accumulates, an increasingly thick dust layer is formed on the plate (that is, sheet) electrode. In the situation in which the particulate matter comprises significant portions of high resistivity material, the voltage drop across the high resistivity dust layer near the anode plates also acts to reduce the voltage drop between the cathode and the dust layer and can reduce particle charging and collection. Moreover, a high electric field can be created within the dust layer such that there is a tendency for an efficiency-robbing back-corona discharge to occur within the dust layer. These high resistivity dust layers can exhibit back-corona phenomena in which ions are actually emitted from the dust layer toward the cathode wires. Consequently, this back-corona phenomena acts to reduce particle charging and collection. Even though the dust layer may be periodically removed by means of vibrating, rapping, or otherwise flexing the anode plates, there is still an efficiency reduction concomitant with the formation of this highly-resistive layer. For the case of high resistivity dust, it is desirable to limit the current through the dust layer so as to preclude this back-corona phenomenon. One solution that has been proposed for this problem is to operate the precipitator near the corona on-set voltage. However, this method results in current inhomogeneities, loss of efficiency and presents control difficulties. Accordingly, efficient but yet effective and economical ways of energizing precipitators are highly desirable, particularly for the collection of dust particles exhibiting high resistivity, that is, a resistivity of about $10^{31\ 11}$ ohm-cm, or higher. For example, such dusts are created in the burning of low sulfur coal used by the electric utility industry.

The design and operation of electrical circuits for precipitator energization has taken many different paths in hope of arriving at a method of precipitator operation which is efficient, reliable, controllable and relatively inexpensive to implement. Furthermore, there has not been broad agreement amongst the practitioners in this art with respect to optimal precipitator energization methods. The proliferation of directions which various practitioners have undertaken is exemplified in the discussion below in which specific articles and patents are considered. However, it will be appreciated that the various pulse energization methods considered by other practitioners in the art, generally fall into one of two categories: broad pulse powering and narrow pulse powering. It should also be appreciated that electrical circuitry for precipitator energization is typically limited to producing two basic pulse waveforms, namely, the sinusoidal pulse and the rectangular pulse. In those prior art precipitator designs which principally rely on the production of sinusoidally-shaped pulses, it will generally be appreciated that the cost of circuit components which are capable of such operation is generally relatively inexpensive since rapid switching problems do not occur. However, the nature of the sinusoidal pulse is inherently limited. For example, broad pulse powering methods employing sinusoidal pulses must, of necessity, employ sinusoidal waveforms (typically rectified waveforms) which have a relatively long period because of the broad width nature of the pulse. However, such sinusoidal waveforms, with their large periods, exhibit slow rise and fall times so that the time duration of peak precipitator energization is relatively small. Accordingly, the amount of power which can be efficiently applied to dust collection in this time period is significantly reduced.

As an alternative to sinusoidal pulse energization methods, rectangular pulses exhibiting relatively sharp rise and fall times and relatively flat peak levels may also be effectively employed in precipitator energization. However, it must be born in mind that, in this case, "precipitator energization" means the rapid switching of extremely high voltage and current levels. While it is possible to produce and employ such rectangular pulses, it is nonetheless often impractical to do so without incurring a large component cost for switching elements which are required to perform the rapid switching function. Furthermore, even if an economic investment is made in such high voltage switching equipment, its long-term reliability in field operations is often a significant problem because of the great electrical stresses which are of necessity applied to such high voltage, high speed, high energy switching components. Accordingly, rectangular pulses employed for electrostatic precipitator energization exhibit significant limitations.

Several experimenters in the art of electrostatic precipitators have proposed various means for electrically enhancing the collection efficiency of an electrostatic precipitator over that obtainable with conventional rectified a.c. powering. These methods have involved the use of electrical pulses superimposed on a steady reference voltage and fall into the two general categories recited above: narrow pulse powering and broad pulse powering. Narrow pulse powering systems have been described, for example, by Research-Cottrell, Inc. in an article in their technical bulletin, copyrighted in 1979, titled "Technological Development of Pulse-Energization". In the narrow pulse powering scheme disclosed, pulses of very short duration (approximately 1 microsecond or less) are applied together with a conventional rectified 60 Hertz reference voltage. However, there are several significant problems associated with narrow pulse energization schemes. First among these problems is the cost of the circuit components required to perform the high speed switching functions. Additionally, energy recovery in narrow pulse powering schemes is very difficult and is seldom, if ever, achieved. A factor in the inability of the narrow pulse powering systems to recover energy supplied in one part of the cycle is the fact that a significant portion of the energy supplied to the system of wires and plates may in fact be radiated as electromagnetic waves. This not only results in the loss of a portion of the usable energy, but it also can significantly result in the production of radio frequency interference and associated EMI problems. Another significant problem associated with narrow pulse powering systems is the reliability of the circuit components, as pointed out above. Therefore, it is seen that narrow pulse energization systems exhibit significant limitations as precipitator energization systems.

Another circuit which discloses pulse powering of electrostatic precipitators using pulses having a duration of approximately 70 microseconds, is disclosed in an article by Helge H. Petersen titled "New Trends in Electrostatic Precipitation: Wide Duct Spacing, Precharging, Pulse Energization" appearing in Volume IA-17, No. 5 of the *IEEE Transactions on Industry Applications* in the September/October, 1981 issued on pages 496–501. In the operation of the circuit disclosed in the Petersen article, the d.c. component of the energizing waveform is maintained just below the corona on-set level so that the pulse provides a major portion of the energy for particle collection. Control of precipitator current is accomplished by varying pulse frequency. To supply the level of pulse power which is desired, Petersen teaches that it is generally necessary to apply the pulse voltage to the precipitator for a relatively long period of time, if it is to perform any significant amount of work on the particle. Furthermore, the voltage pulse generated by the circuit illustrated in the Petersen article exhibits a voltage undershoot characteristic which is not in itself a major problem, but under circumstances in which the pulse frequency is increased, the undershoot increases in magnitude and the resultant voltage applied to the precipitator becomes an essentially continuous sinusoidal wave symmetrically superimposed on the d.c. reference voltage. As a result, the pulse voltage subtracts from the reference voltage every half-cycle and is less effective than a unidirectional pulse in enhancing particle charging and collection processes, particularly when the reference voltage is close to the corona on-set voltage. Accordingly, there exists a need for an improved electrostatic precipitator pulsing system which addresses these difficulties.

Precipitator systems exhibiting pulse durations between about 0.2 and 2 milliseconds have been generally described as broad pulse powered systems. The optimal or near optimal waveform for pulsing a precipitator would assure that high current and voltage are applied simultaneously for the maximum duration which is commensurate with avoiding back-corona discharge. Sustained operation at these high voltages results in maximum particle charge, enhanced particle migration and a uniform current density. Broad pulse powered systems having many of these characteristics are described, for example, in the article titled "High Voltage Thyristors Used In Precipitators" published in *Control Engineering*, 1981, written by Jerry F. Shoup and Thomas Lugar. In the described system, two high voltage valves are required, each comprising a plurality of thyristors connected in series along with voltage equalizing components to obtain the desired voltage rating. These valves unfortunately can suffer from reliability problems because of the voltage stresses which are applied to them. Furthermore, these valves are also relatively expensive.

In U.S. Pat. No. 3,915,672, issued Oct. 28, 1975 to Gaylord W. Penney, there is disclosed an electrostatic precipitator energization circuit; however, the disclosed circuit requires switching of high voltages which can significantly impact circuit costs and reliability. Moreover, the precipitator disclosed in the Penney patent is directed specifically to a precipitator employing a three-electrode structure.

In general, broad pulse powering methods have required that the pulse waveform exhibit a flat waveshape in which the peak level is maintained for a time sufficient to supply the desired amount of power to the precipitator to enable it to perform its collection function. In the case of high resistivity dusts, particle collection rates can be increased substantially for those waveforms exhibiting short rise and fall times relative to the pulse duration. Additional improvement is noted by the present inventors with the use of rapidly pulsed electric fields in which improvement is attributed to the fact that back-corona in layer dust is apparently inhibited by the rapid fluctuations, whereas it is less inhibited in a relatively slowly time varying electric field. The present inventors attribute this phenomenon to the effective presence of a relatively large RC time constant. This time constant arises from a model of the dust layer as a parallel combination of a resistor and a capacitor. Certainly, this layer exhibits both of these effects.

In U.S. Pat. No. 4,052,177, issued Oct. 4, 1977 to Leif Kide, a circuit is disclosed which returns some of the stored capacitive energy on the precipitator to a d.c. storage capacitor to increase the overall electrical efficiency of the circuit. However, the pulse powering methods disclosed by Kide are essentially the same as discussed above in the Petersen article. The rise and fall times of the pulse waveshapes are determined by the half sinusoidal shape of the pulse generated by the circuits of such systems.

Additional background material on the powering of electrostatic precipitators may be found in the article "A Pulse Method for Supplying High Voltage Power for Electrostatic Precipitation" by H. J. White, appearing in the November 1952 issue of the *IEEE Transactions,* on page 326 thereof.

In short, it is seen that one of the significant problems in the powering of electrostatic precipitators is the necessity of providing control of precipitator current to prevent back-corona while maintaining high efficiency. These have generally been considered to be contradictory control and design goals. Economical and controllable energizing methods which provide simultaneous application of voltage, particle charging and current are nonetheless desired. It further appears that the peak voltage of the pulse should be sustained for a controllable duration to provide the necessary precipitation energy. However, the transformer-coupled systems of Kide and Petersen generate a sinusoidal rather than flat top pulse so that the peak voltage exceeds that used by the broad pulse generated by the systems of Lugar and Shoup or Penney for a given level of pulse energy. As a result, back-corona conditions are more likely to occur. However, because of the expense, difficulty and reliability associated with the high voltage electrical switching components in broad pulse powering systems, another method and means would be highly desirable whereby the benefits of broad pulse powering could be achieved with improved reliability and lower costs. Furthermore, it is desired that these improvements occur without loss of control of precipitator power and current levels and without the concomitant production of undesirable and wasteful levels of radio frequency radiation. Applicants'invention, as discussed below, is seen to attain these objectives.

Because the width of the pulse in a broad system is typically chosen so that it is on the order of, or slightly shorter than, ion transit time within the precipitator, substantially all of the charge injected into the precipitator during the pulse resides in the gas volume between the electrodes when the pulse is terminated. This large space charge can act to shield the corona electrodes and can reduce the electric field in the vicinity of this electrode. Consequently, the injected current is a maximum at the beginning pulse and decreases with time. This phenomenon is true for broad pulse systems in general. However, the ramped pulse burst precipitator energization method disclosed herein significantly alleviates such problems.

From the above discussion relating to the energization of electrostatic precipitators, it should be appreciated that there is wide disagreement amongst practitioners in the art as to what constitutes an optimal energization method. Furthermore, there is an even greater array of opinions attempting to explain, on a theoretical basis, the effectiveness of one method over another. This is a direct result of the fact that, alothough precipitators operate on fairly well-understood fundamental principles, nonetheless there are a number of critical secondary effects and control variables that can be employed in the design of precipitator energizing circuits. However, the pulse burst energization scheme disclosed by the present inventors has not hithertofore been disclosed or proposed as a solution to the array of conflicting problems associated with precipitator energization, particularly when high resistivity dusts are to be collected. None-theless, the method of the present invention overcomes a number of the problems associated with precipitator energization, as discussed above, and in particular, the method of the present invention exhibits high reliability, low cost, low levels of electromagnetic radiation and the capability for energy recovery.

SUMMARY OF THE INVENTION

In accordance with a preferred embodiment of the present invention, precipitator energization is accomplished through the use of a broad pulse powering method in which the voltage of the broad pulse increases with time. This energization method is applicable not only to broad pulse powering systems in general, but also to the pulse burst powering method disclosed herein. As applied to the pulse burst powering energization methods, the pulse bursts in accordance with the present invention exhibit voltage levels which increase from pulse to pulse within each pulse burst. The effect of this ramped voltage is to increase the average electric field and ion density during the pulse. The result is substantially higher particle charging, which leads to improved particle collection efficiency. Accordingly, each successively applied pulse in a burst is more effective than constant peak pulse voltage systems since the previous pulse did not generate as large a space charge shield around the corona electrode (typically the wire electrode). Consequently, in accordance with the present invention, the current injected into the precipitator is more uniformly distributed during the time of a single pulse burst.

In accordance with a preferred embodiment of the present invention, a method for operating an electrostatic precipitator comprises applying a sequence of bursts of high voltage unidirectional pulses superimposed on a d.c. reference voltage across the electrodes of the precipitator. Furthermore, each successive pulse within the pulse burst exhibits a greater peak voltage than the preceding pulse. Typically, the peak pulse voltage increases in a linear fashion during a single pulse burst. As used herein, and in the appended claims, the term "pulse burst" possesses its conventional meaning as employed in the electrical arts, namely, that of a closely-spaced sequence of pulse waveforms. In accordance with a preferred embodiment of the present invention, the pulse burst has a duration of between about 0.1 and 5 milliseconds. In accordance with another preferred embodiment of the present invention, the waveforms in the pulse bursts each may have a period of between 0.02 milliseconds and about 0.7 milliseconds. Generally, the applied d.c. voltage level is between about 15 and about 50 kilovolts and is generally selected to be below the corona onset level. Additionally, an apparatus for practicing the above-described method is disclosed. Furthermore, while the present invention is discussed herein with particular reference to pulse burst powering methods and apparatus, it should also be appreciated that the present invention is applicable to conventional broad pulse powering systems in which the pulse voltage is increased during the duration of the pulse.

Accordingly, it is an object of the present invention to provide a method and apparatus for operating electrostatic precipitators, the method having the advantages of broad pulse powering.

It is also an object of the present invention to provide electrostatic precipitator operating means which do not require incorporation of a large number of high-voltage, series-connected semiconductor valves.

It is also an object of the present invention to provide recovery of the reactive energy periodically transferred to an electrostatic precipitator.

It is a still further object of the present invention to provide the means for more precisely controlling power supplied to an electrostatic precipitator.

It is also an object of the present invention to provide energizing voltage levels across the precipitator which exhibit rapid rise and fall times.

Additionally, it is an object of the present invention to mitigate the problems associated with space charge shielding of the corona electrode.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
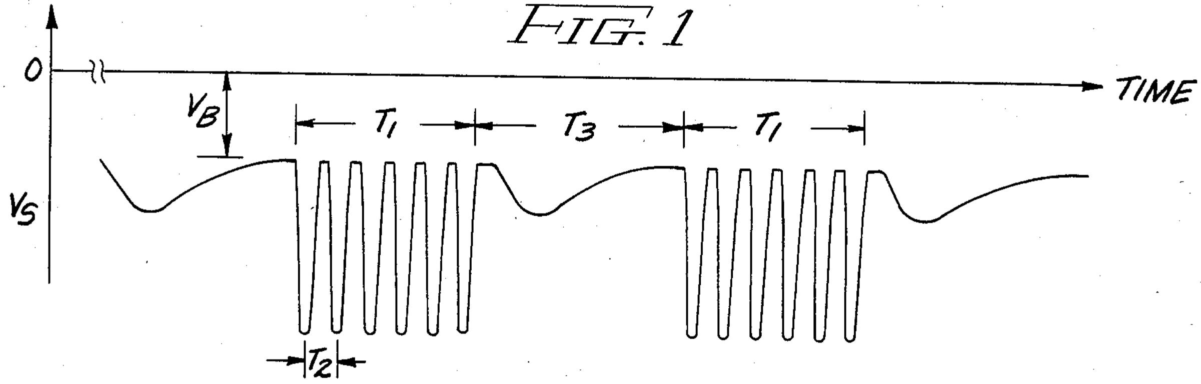
FIG. 1 is a graph of precipitator voltage as a function of time more particularly illustrating the repetitive pulse burst and d.c. reference voltages.

The pulse burst powering method disclosed in the above-mentioned concurrently-filed application is best illustrated by the waveform shown in FIG. 1 which illustrates a plot of $V_s$, the precipitator voltage as a function of time. From the reference direction for $V_s$ in FIG. 1 and the reference direction provided in FIG. 3 for $V_s$, it is readily seen that it is the wire electrodes which are preferably negatively charged in electrostatic precipitator applications. It is also seen from FIG. 1 that there is present in $V_s$ a d.c. component, $V_B$. This d.c. value is typically selected to be at a level below corona onset. In this manner of operation, the d.c. voltage supply provides no power to the precipitator, but merely precharges the precipitator capacitance to reduce the power required from the pulse supply and enables complete control of the power supplied to the precipitator to be effected by controlling the height and width of each pulse burst. It is of particular interest to note that these two quantities are readily controllable on the low voltage side of the apparatus shown in FIG. 3 through the appropriate selection of turn-on times for thyristor $Q_1$ and transistor $Q_2$. The low voltage side of the apparatus shown in FIG. 3 comprises those elements on the primary side of step-up pulse transformer $T_p$.

In accordance with the pulse burst powering method illustrated in FIG. 1, a pulse burst having a duration of $T_1$ seconds is applied to the precipitator. The pulses comprising the pulse burst exhibit a periodicity of $T_2$ seconds. Of course, $T_2$ is less than or equal to $T_1$. Following the application of the pulse burst for $T_1$ seconds, the pulse burst is interrupted for a time $T_3$. However, during this time period, some voltage may nonetheless be present across the precipitator as the result of collapsing inductive fields particularly in secondary winding, S, of transformer $T_p$. However, this induced voltage subsides after a period of time determined primarily by capacitance $C_c$, the resistance and inductance of secondary windings and the effective resistance component $R_s$ of the precipitator $P_r$.

Depending upon the nature of the dust being collected, the precipitator electrode spacing and other factors such as the desired collection rate and the pulse magnitude ($V_s$-$V_B$), the pulse burst duration, $T_1$, is typically selected to be between about 0.1 milliseconds and 5 milliseconds. Primarily to control the formation of back-corona discharge, the periodicity of the individual pulses, $T_2$, is generally selected to be between about 0.02 milliseconds and about 0.7 milliseconds. Furthermore, the ratio $T_1/(T_1+T_3)$, the duty cycle, is also controllable to govern the average level of power supplied to the precipitator and, accordingly, other variables such as the dust collection rate. The sum $T_1+T_3$ is typically selected to produce a pulse burst repetition rate of at least one but generally less than about 400 bursts per second. Thus, $T_2$ and $T_3$ are selectable in combination to control back-corona formation and power delivered to the precipitator.

The pulse bursts produce high intensity corona discharge at the precipitator wires as well as providing an increase in average field strength for a selected period of time to increase particle charging by negative ions in the region between the wire electrodes and the dust layer which covers the collector plates. The precipitator voltage rises and falls rapidly several times during each pulse burst. This fluctuation controls precipitator current and acts to limit the voltage drop across the dust layer. Precipitator current is easily controlled by changing the number of pulses per burst, their magnitude, the width of each pulse and the pulse burst repetition rate to effect the desired operation. This is done with relatively low power, low cost electronic components. Additionally, the rise and fall times at the beginning and end of each pulse burst are rapid and generally equal to the rise and fall times of the individual pulses. A circuit for carrying out these objectives is more particularly illustrated in FIG. 3 which is discussed below.

Figure 2:
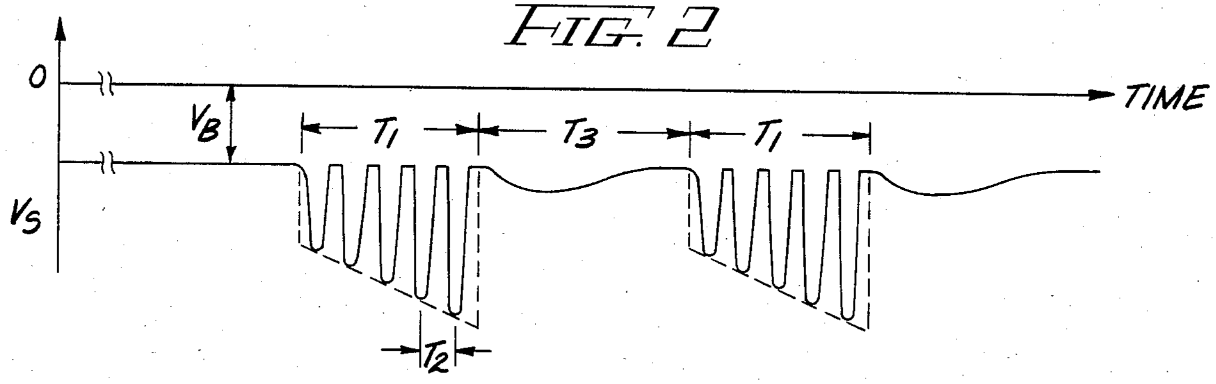
FIG. 2 is a graph of precipitator voltage as a function of time in accordance with the present invention, as applied to a pulse burst precipitator powering system.

However, the principal features of the present invention are best appreciated through an understanding of the voltage waveform illustrated in FIG. 2. FIG. 2 is similar to FIG. 1 except that, in accordance with a preferred embodiment of the present invention, the pulses during a single pulse burst are successively increased in voltage from one pulse to the next. In the typical precipitator design, the increase in peak pulse voltage actually occurs in the negative direction if $V_s$ is established with the reference direction illustrated below in FIG. 3. Thus, the pulse bursts, in accordance with the present invention, generally tend to exhibit trapezoidal envelopes, as suggested by the dotted lines in FIG. 2. However, since the present invention is not limited to use with pulse burst powering methods, the dotted trapezoidal-like pulses shown in FIG. 2 may actually comprise waveforms for electrostatic precipitator energization. In short, one form of broad powering may comprise a sequence of trapezoidal pulses in which the pulse voltage is increased during the duration of the pulse. The timing considerations for the waveforms illustrated in FIG. 2 are substantially the same as those shown and discussed above with respect to the waveforms shown in FIG. 1.

Because the width of the pulse in a broad pulse precipitator energization system is typically on the same order or slightly shorter than the ion transit time, all of the charge injected during the pulse is in the gas volume between the electrodes when the pulse is terminated. This large space charge shields the corona electrode and reduces the electric field in the vicinity of the electrode. Consequently, the injected current is at a maximum value at the beginning of the pulse and decreases with time during the pulse. This aspect of broad pulse powering is a disadvantage to the method which is somewhat, but not entirely, mitigated by the use of pulse burst powering to provide the same effects as conventional broad pulse powering.

Figure 3:
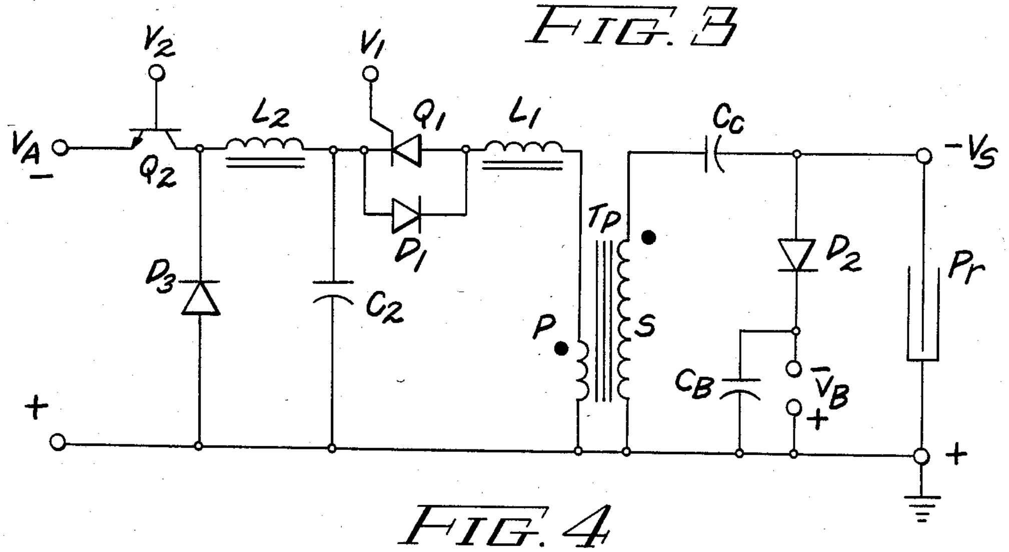
FIG. 3 is a schematic diagram illustrating a preferred embodiment of the present invention.

A circuit for carrying out the proposed method of the present invention is illustrated in FIG. 3. With respect to FIG. 3, the high voltage side of the circuit is considered first. The circuit includes capacitor $C_c$ which couples the voltage from the secondary winding S of transformer $T_p$ to the precipitator $P_r$ whose internal effective capacitance is designated as $C_s$ and whose internal effective load resistance is designated as $R_s$. Capacitor $C_c$ is charged through diode $D_2$ on positive excursions of the secondary voltage. The voltage on $C_c$ adds to negative excursions of the secondary voltage. Diode $D_2$ becomes reverse biased and the precipitator voltage is increased (in the negative direction) above the reference voltage $V_B$. It should also be noted, though, that precipitators constructed and operated in accordance with the present invention do not necessarily require the presence of reference voltage $V_B$, although it is preferred.

The presence of diode $D_2$ provides a significant advantage for the operation of the present invention. This advantage is best appreciated by noting that during the time period $T_1$, as shown in FIG. 1, the pulses in the pulse burst are clipped along the bottom portions of their positive excursions, thereby preventing the voltage $V_s$ from ever decreasing below the d.c. reference level, $V_B$, which is typically kept less than 40 kilovolts. Furthermore, bypass capacitor $C_B$ provides a low impedance path for charging current through capacitor $C_c$ and diode $D_2$ during pulsing.

Next is considered the low voltage, or primary side of the circuit illustrated in FIG. 3. Capacitor $C_2$ is charged from the d.c. supply source $V_A$ through a pulse-width modulation transistor $Q_2$. The width of the pulses in voltage waveform $V_2$, which is applied to the base of transistor $Q_2$, controls the level of the voltage developed accross capacitor $C_2$. Such a waveform is illustrated below in FIG. 5. It is the voltage across capacitor $C_2$ which supplies energy to form the pulse bursts applied to the precipitator. Thus, in this way, $V_2$ operates to control the pulse burst amplitude.

Fly-back diode $D_3$ acts in concert with choke $L_2$ to transfer energy stored in choke $L_2$ to capacitor $C_2$ whenever transistor $Q_2$ is turned off at the end of each $V_2$ pulse. It is further seen, in FIG. 3, that the circuit is arranged to be powered by a negative voltage source $V_A$ to avoid the need for inverting the polarity of the secondary voltage with respect to the primary voltage of transformer $T_p$. It is additionally seen in the primary circuit that a single thyristor inverter $Q_1$ having a reverse-conducting feedback diode $D_1$ is used to drive the primary winding of transformer $T_p$. The number of thyristor switching elements will depend on the voltage applied, the rating of the thyristors and the required primary inductance. The precipitator capacitance along with capacitance $C_c$, is reflected into the primary winding P of transformer $T_p$ as $C_1$ to act with inductor $L_1$ (external to transformer $T_p$) as a series resonant commutating circuit for thyristor $Q_1$. In particular, the value of inductor $L_1$ is selected to assist in the control of the width of the individual pulses within the pulse burst. Furthermore, choke $L_2$ and capacitor $C_2$ are selected to be resonant at a much lower frequency than the resonant frequency of inductor $L_1$ and $C_1$, the effective capacitance reflected into the primary circuit. The presence of diode $D_1$ permits the recovery of pulse burst energy during quiescent portions of the pulse burst. This recovered energy is stored in capacitor $C_2$. This arrangement is particularly effective in reducing energy costs and increasing the electrical efficiency of the pulsing circuit. In some other precipitator pulse powering circuits, this energy is instead dissipated by resistive means which must be provided with separate cooling capabilities. In this respect, the present apparatus is similar to the Smidth circuit shown in FIG. 7 of the above-mentioned Petersen paper. However, significant differences exist in the way the pulses are applied and coupled to the precipitator. Accordingly, a significantly different waveform is applied to the precipitator of the present invention than that developed by the Smidth circuit.

Figure 4:
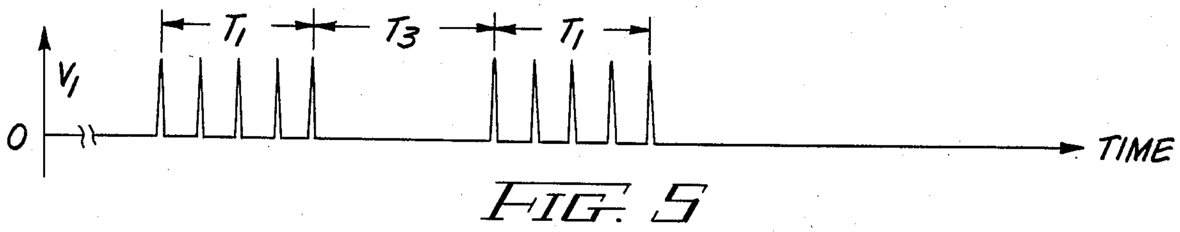
FIG. 4 is a graph of trigger pulse waveforms used to control initiation and interruption of the pulse bursts.
Figure 5:
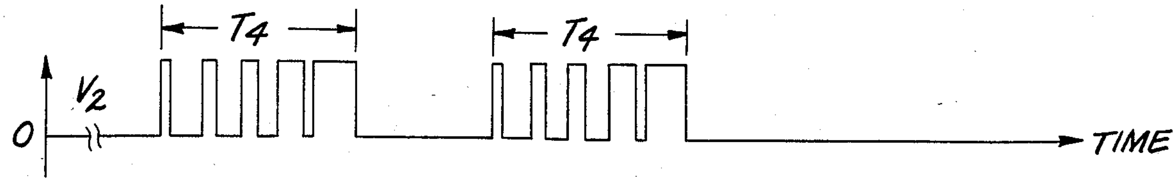
FIG. 5 is a graph illustrating a pulse width control waveform used to control peak pulse burst voltages.

A significant advantage of the present invention is that a rapidly controllable means for altering the amplitude of each individual pulse in a burst sequence, as well as the amplitude of one pulse burst from one burst to the next, is provided in the primary, low voltage circuit of the apparatus of FIG. 3. In particular, FIGS. 4 and 5 illustrate a consistent set of waveforms which may be applied to thyristor $Q_1$ and transistor $Q_2$ to effect the generation of the desired waveform across precipitator $P_r$. The duration of the pulse burst is preferably controlled by application and removal of the gate voltage pulses applied to the gate of thyristor $Q_1$. In particular, this time period is designated as $T_1$ in FIG. 4. The trigger pulse waveform $V_1$ applied to thyristor $Q_1$ also controls the length of time for which the pulse burst is absent, this time being designated $T_3$.

In a typical application, inductor $L_1$ (which can be comprised partially or wholly of the primary leakage reactance of transformer $T_p$ will have an inductance of about 400 microhenries and choke $L_2$ will have an inductance of approximately 2,000 microhenries or more. Capacitance $C_2$ typically possesses a value of about 300 microfarads and capacitor $C_c$ typically possesses a value of about 5 microfarads. The effective capacitance of precipitator $P_r$ can be as large as approximately 0.15 microfarads. It is also desired that the power supply providing d.c. bias voltage $V_B$ also possess an inherent capacitance $C_b$ which is larger than $C_c$ . Under these conditions, time $T_1$ is preferably selected to be about 700 microseconds; and time $T_3$ is selected to be about 2,000 microseconds; and time $T_2$ is selected to be approximately 140 microseconds.

From the above, it should be appreciated that the present invention offers several significant advantages not found in the prior art methods and apparatus for powering electrostatic precipitators. In particular, the present invention provides a method of broad pulse powering in which a relatively uniform current level is injected into the precipitator during a pulse or pulse burst. This goal is accomplished while at the same time providing rapidly rising and falling voltage levels across the precipitator itself. Additionally, several variables are available for the control of the precipitator power, including pulse burst duration, pulse burst amplitude, pulse burst frequency and the peak voltage level for each pulse in the burst. The control of the voltage across the precipitator is accomplished through the use of low voltage circuit components. Such components are generally less expensive and more reliable than their high voltage circuit counterparts. Moreover, the present circuit and method are particularly effective in the reduction of back-corona and the problems associated therewith. The methods of the present invention are not only efficient but are also highly reliable. The present invention also permits the use of an inexpensive step-up transformer. Further, the voltage across the precipitator can be controlled so that it never falls below the d.c. reference voltage level and the circuit of the present invention permits recapture of energy stored on the precipitator itself. Lastly, it should also be noted that the present invention is not limited to a situation in which the peak pulse voltage levels in a pulse burst are increased linearly with time during a pulse burst so that the envelope is substantially trapezoidal. Thus, the present invention also embraces other schemes for monotonically increasing the peak pulse voltage level over the duration of a broad pulse.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claim is:

1. A method of operating an electrostatic precipitator, including two electrodes, comprising the steps of:

applying a burst of high voltage pulses across the electrodes of said precipitator for a period of time $T_1$, wherein said $T_1$ time period is chosen to be less than the ion transit time between said electrodes, the period between successive ones of said pulses being $T_2$, wherein said $T_2$ time period is small enough to prevent back-corona discharge, and wherein $T_1$ must be greater than $T_2$, the pulses in said burst exhibiting peak voltage levels which increase from pulse to pulse within said burst such that a substantially uniform current is injected between said electrodes during said burst;

interrupting the application of said burst for a time period of $T_3$, wherein said $T_3$ time period is chosen to be greater than the ion transit time between said electrodes; and periodically repeating said above-recited steps.

2. The method of claim 1 in which a d.c. voltage is simultaneously applied across said electrodes, the polarity of said d.c. voltage matching the polarity of said pulses.

3. The method of claim 2 in which said d.c. voltage is selected to be just below the onset of corona discharge between said electrodes.

4. The method of claim 2 in which said d.c. voltage is selected to be between 15 and 50 kilovolts.

5. The method of claim 1 in which $T_1$ is between 0.1 and 5 milliseconds.

6. The method of claim 1 in which $T_2$ is between 0.02 milliseconds and 0.7 milliseconds.

7. The method of claim 1 in which the duration of said $T_3$ time period is selected such that the sum of said pulse burst period $T_1$ and said interruption period $T_3$ provides a time interval which corresponds to a pulse burst repetition rate of between 1 and 400 pulse bursts per second.

8. Apparatus for providing power from a direct current (d.c.) electrical power source to an electrostatic precipitator such that said power is provided to said precipitator in the form of pulse bursts wherein each burst is applied for a time period $T_1$, the pulses of said bursts having peak amplitudes which increase from pulse to pulse and each pulse having a time period $T_2$, with a time period $T_3$ between each burst, said apparatus comprising:

a transformer, including primary windings and secondary windings, wherein each said primary and secondary windings includes first and second leads for receiving and delivering electrical power to and from said transformer, each said second lead being coupled to a reference potential;

first impedance means for coupling said first lead of said secondary windings of said transformer to said precipitator;

second impedance means for storing the electrical power supplied by said power source such that said electrical power may later be applied to said precipitator;

switch means, responsive to a user provided control signal, for momentarily coupling said second impedance means to said first lead of said primary windings of said transformer such that the electrical power stored by said second impedance means may be transferred to said precipitator via said transformer, said switch means being operable, therefore, to determine the period $T_2$ between each pulse of each burst as well as the period of time $T_3$ between each burst;

pulse width modulation means adapted to be coupled to said power source and responsive to a user provided control signal, for providing electrical power to said second impedance means such that the electrical power delivered by said power source may be stored by said second impedance means, said pulse width modulation means being further adapted to control the duration of time that said power source is coupled to said second impedance means and thereby control the amount of electrical power which is stored by said second impedance means, said, pulse width modulation means being operable, therefore, to modulate the peak amplitude of each pulse of said burst.

9. The apparatus of claim 8 further comprising direct current (d.c.) electrical voltage means for simultaneously applying a d.c. voltage across said precipitator such that the polarity of said d.c. voltage is the same as the polarity of said pulses.

10. Apparatus as recited in claim 9 further including diode means coupled in series with said d.c. voltage means such that the serial combination of said d.c. voltage means and said diode means is coupled in parallel with said precipitator and said diode means prevents the voltage of said precipitator from decreasing below the voltage of said d.c. voltage means.

11. The apparatus of claim 10 in which said d.c. voltage means are constructed so as to supply a d.c. voltage level just below the d.c. voltage level whereat corona discharge begins.

12. The apparatus of claim 10 in which said d.c. voltage means are contructed so as to supply a d.c. voltage of between 15 and 50 kilovolts.

* * * * *